United States Patent
Baldwin, Jr. et al.

(10) Patent No.: US 6,966,436 B2
(45) Date of Patent: Nov. 22, 2005

(54) ABSORBENT MATS FOR FOOD PACKAGING

(75) Inventors: Alfred Frank Baldwin, Jr., Greensboro, NC (US); Richard James Bliton, Greensboro, NC (US); Jessica Zingelmann Brown, Oak Ridge, NC (US); Kyra Darnella Dorsey, Greensboro, NC (US)

(73) Assignee: Precision Fabrics Group, Inc., Greensboro, NC (US)

( * ) Notice: Subject to any disclaimer, the term of this patent is extended or adjusted under 35 U.S.C. 154(b) by 317 days.

(21) Appl. No.: 10/427,282

(22) Filed: May 1, 2003

(65) Prior Publication Data

US 2004/0226834 A1 Nov. 18, 2004

(51) Int. Cl.[7] ................................................ B65D 81/26
(52) U.S. Cl. ........................ 206/204; 428/196; 428/137
(58) Field of Search ................................. 206/204, 205; 426/124, 129, 132, 331, 332; 428/133, 137, 34.2, 34.3, 288, 196

(56) References Cited

U.S. PATENT DOCUMENTS

| | | |
|---|---|---|
| 3,761,011 A | 9/1973 | Reifers et al. ................ 229/2.5 |
| 3,886,941 A * | 6/1975 | Duane et al. ................ 604/370 |
| 4,116,892 A | 9/1978 | Schwarz ....................... 521/62 |
| 4,234,647 A | 11/1980 | Murphy et al. .............. 428/220 |
| 4,349,146 A | 9/1982 | Holden ......................... 229/2.5 |
| 4,368,565 A | 1/1983 | Schwarz ........................ 26/99 |
| 4,382,507 A | 5/1983 | Miller ......................... 206/204 |
| 4,756,939 A | 7/1988 | Goodwin ....................... 428/74 |
| 4,899,925 A | 2/1990 | Bowden et al. ............... 229/2.5 |
| 4,940,621 A * | 7/1990 | Rhodes et al. .............. 428/137 |
| 5,176,930 A * | 1/1993 | Kannankeril et al. ........ 426/124 |
| 5,250,310 A | 10/1993 | Fujino et al. ................ 426/124 |
| 5,567,501 A * | 10/1996 | Srinivasan et al. .......... 428/137 |
| 5,628,097 A | 5/1997 | Benson et al. ................ 28/165 |
| 6,079,555 A | 6/2000 | Posson ......................... 206/204 |
| 6,171,695 B1 | 1/2001 | Fontenot et al. ............ 428/337 |
| 6,223,894 B1 | 5/2001 | Lemaire ....................... 206/204 |
| 6,830,800 B2 * | 12/2004 | Curro et al. ................. 428/136 |

FOREIGN PATENT DOCUMENTS

WO WO 01/47456 7/2001 ........... A61F/13/15

* cited by examiner

Primary Examiner—Shian T. Luong
(74) Attorney, Agent, or Firm—Myers Bigel Sibley & Sajovec, P.A.

(57) ABSTRACT

An absorbent mat includes top and bottom layers of thermoplastic material with absorbent media disposed therebetween. The top and bottom layers are bonded directly together, or to the absorbent media disposed therebetween, in spaced-apart bond sites. One or more perforations are formed as a result of bonding in the top and/or bottom layers in a peripheral portion of each bond. Each perforation is in communication with the absorbent media and provides a pathway through which liquid can pass. The top and bottom layers may be monolithic thermoplastic film with an aperture formed therethrough at each respective bond by stretching the multi-layer absorbent mat. One or more perforations are formed in the peripheral portion of each bond site thereof as a result of stretching. Each perforation is in communication with the absorbent media and provides a pathway through which liquid can pass into the absorbent media.

31 Claims, 4 Drawing Sheets

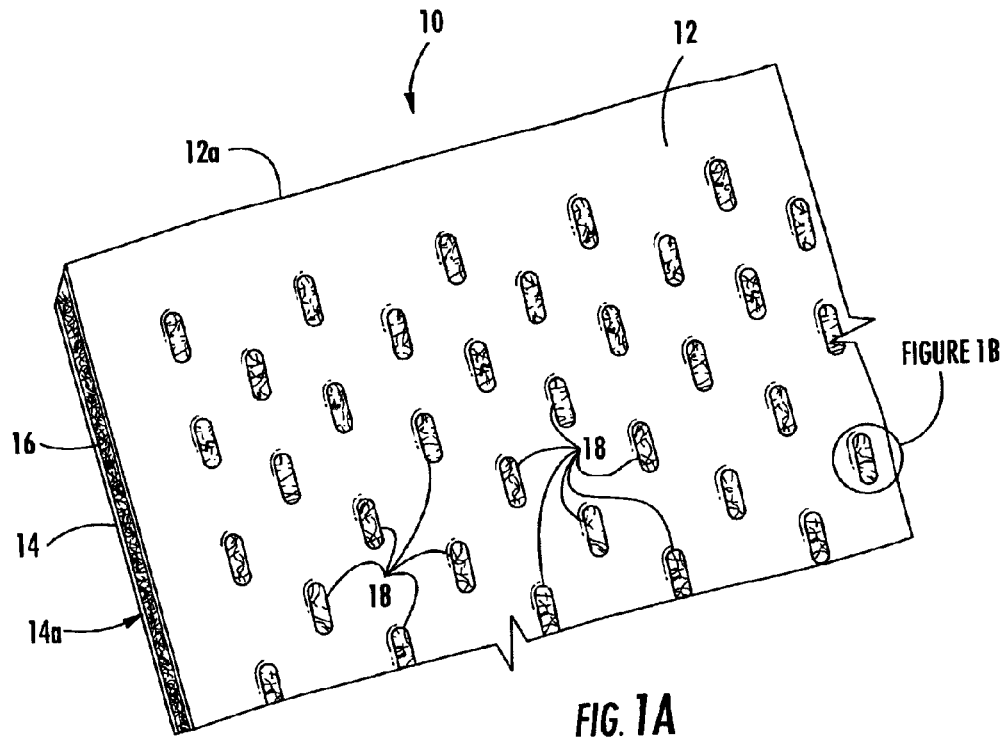
FIG. 1A
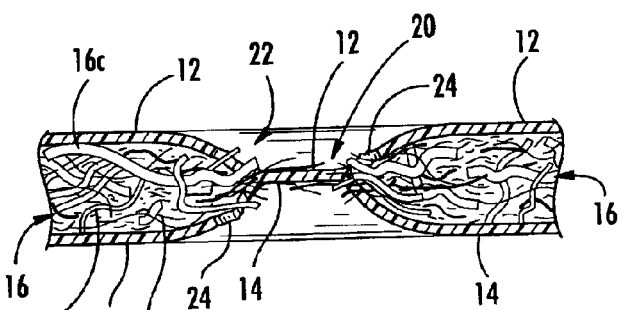
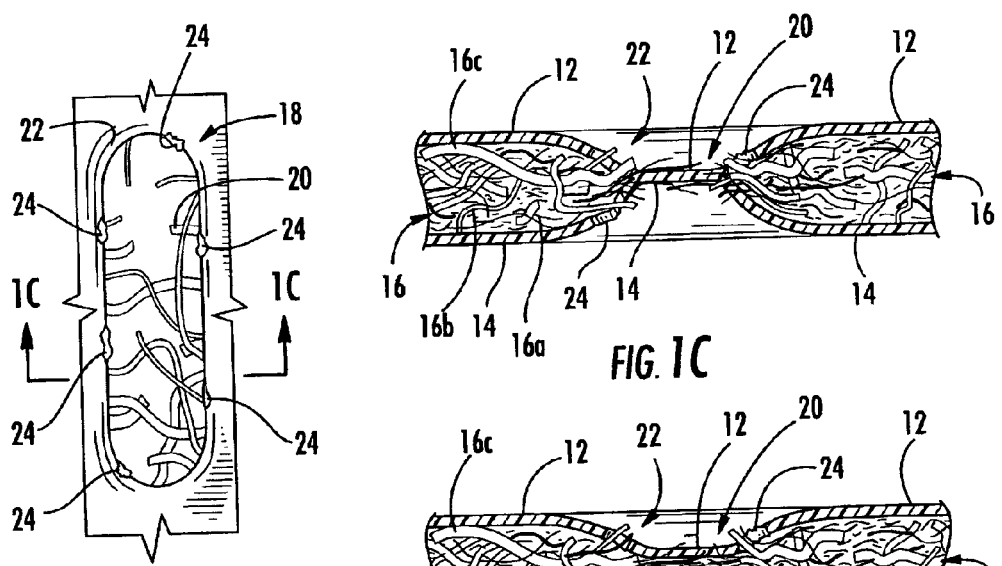
FIG. 1B
FIG. 1C
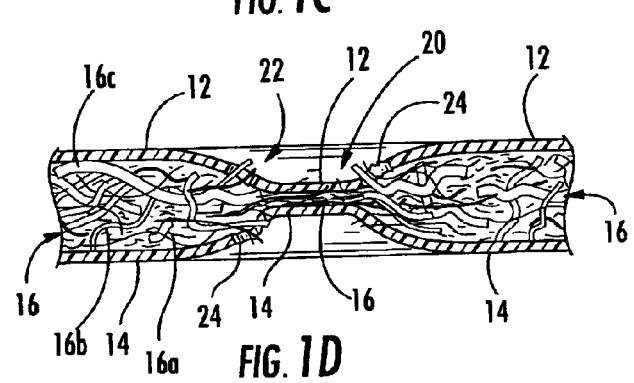
FIG. 1D

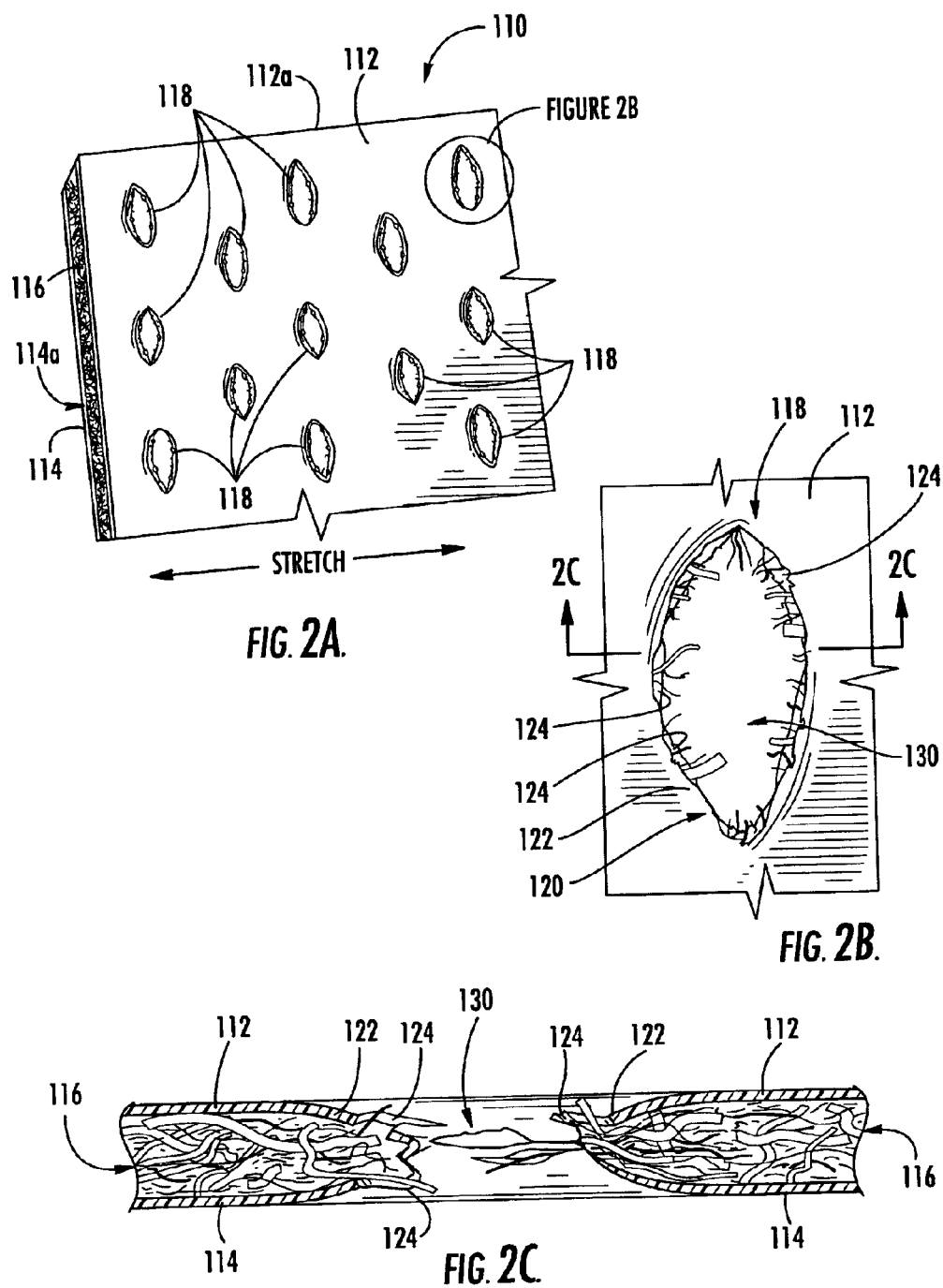

ABSORBENT MATS FOR FOOD PACKAGING

FIELD OF THE INVENTION

The present invention relates generally to packaging and, more particularly, to food packaging for improving the appearance of and protecting various food products.

BACKGROUND OF THE INVENTION

Conventionally, meat, poultry, and other food products are displayed in individual packages which include a supporting tray having an absorbent pad in the bottom thereof to absorb liquids (e.g., blood, water, saline, mixtures thereof, etc.) exuded from the food product. A transparent outer plastic wrapping is usually employed to cover and surround the food product and tray to complete the package. There have been various attempts to control liquids exuded from food products within packaging in order to extend the shelf-life of such food products. For example U.S. Pat. No. 4,382,507 discloses an absorbent pad disposed in a food package for absorbing juices or other liquids exuded from food products.

Unfortunately, conventional food pads may not adequately absorb and retain exuded liquids from packaged food products. As a result, exuded liquids may accumulate in the tray and may migrate back into the food products, resulting in spoilage and/or discoloration thereof. In addition, exuded liquids may spill or seep from the food package, which may lead to unsanitary conditions.

U.S. Pat. No. 6,171,695 describes an absorbent core bonded to a film top layer. The absorbent core includes multiple layers of absorbent tissue paper calendared or embossed together. The laminate is held together by either mechanical forces or hydrogen bonding. The multiple layers absorb exuded liquids and expand. Unfortunately, the tissue paper layers may delaminate when wet and may not hold moisture well under pressure.

U.S. Pat. No. 5,250,310 describes a bi-layer absorbent pad having an absorbent core topped with a barrier layer of film or hydrophobic nonwoven material. Unfortunately, the absorbent pad is prone to delamination when wet. In addition, the absorbent media may break away and contaminate a food product, which is unsanitary and undesirable.

U.S. Pat. No. 4,756,939 describes an absorbent pad having absorbent media enclosed within a barrier material, such as plastic film. The film is perforated to allow liquids to seep in and be absorbed. Unfortunately, absorbent pads of this type may be slow to absorb liquids and are typically available only in pre-determined sizes, which may lead to liquid under absorption within a food package. These pouch type pads may contain superabsorbent material such as powder, granule, or fiber. The enclosed pouch is thought to be necessary to control the gel that results from the wetting of the superabsorbent material. The enclosed pouch also may expand or rupture when used for vacuum packaging or modified atmosphere packaging. This rupture can contaminate the package and, at times, can contaminate the production area.

Accordingly, there is a continuing need in the food packaging industry for absorbent pads having high levels of liquid absorbency, that do not delaminate easily when soaked in liquid, and that can be easily customized for various types, sizes, and shapes of food packages. It would be desirable to utilize superabsorbent materials in food packaging. Moreover, there is a need in food packaging for an absorbent pad that can absorb from its entire area, including the edges, and that does not trap air when used for modified atmosphere packaging or vacuum processing.

SUMMARY OF THE INVENTION

In view of the above discussion, an improved absorbent mat and food product package is provided that overcomes the limitations of conventional food product packaging. According to embodiments of the present invention, a multi-layer absorbent mat for use within a food product package includes top and bottom layers of thermoplastic material and absorbent media disposed between the top and bottom layers. The top and bottom layers are thermally bonded directly together through the absorbent media at multiple, spaced-apart sites. According to other embodiments of the present invention, the top and bottom layers of thermoplastic material may be thermally bonded to absorbent media disposed therebetween via binder fibers in the absorbent media.

Each bond site is defined by a bond portion where the top and bottom layers are thermally bonded directly together through the absorbent media and a peripheral portion adjacent to the bond portion. One or more ruptures or perforations are formed as a result of thermal bonding in at least one of the top or bottom layers in the peripheral portion of each bond site. Each perforation is in communication with the absorbent media and provides a pathway through which liquid can pass from external to the mat into the absorbent media.

According to embodiments of the present invention, the top and bottom layers may be sealed (e.g., heat sealed, ultrasonically sealed, etc.) together along respective peripheral edges thereof to further contain the absorbent media.

According to embodiments of the present invention, either or both of the top and bottom layers may be formed from nonwoven material or from monolithic polymeric film. Each layer may have a thickness of between about 0.3 mils and about 10.0 mils.

According to other embodiments of the present invention, a multi-layer absorbent mat includes top and bottom layers of substantially liquid impermeable (i.e., monolithic) thermoplastic film, and absorbent media disposed between the top and bottom layers. The top and bottom layers are thermally bonded directly together through the absorbent media at multiple, spaced-apart bond sites. Each bond site is defined by a bond portion where the top and bottom layers are thermally bonded directly together through the absorbent media and a peripheral portion adjacent to the bond portion. An aperture is formed through the top and bottom layers at each respective bond site by substantially evenly stretching the multi-layer absorbent mat via various devices and methodologies (e.g., bow rolls, tentering, ring rolls, interdigitating rolls spreader rolls, etc.) by an amount between about one percent and about seventy percent (1%–70%) of a relaxed configuration thereof. One or more ruptures or perforations are formed in the peripheral portion of each bond site thereof as a result of stretching. Each perforation is in communication with the absorbent media and provides a pathway through which liquid can pass from external to the mat into the absorbent media.

BRIEF DESCRIPTION OF THE DRAWINGS

The accompanying drawings, which form a part of the specification, illustrate embodiments of the present invention. The drawings and description together serve to fully explain the invention.

FIG. 1A is a perspective view of a multi-layer absorbent mat according to embodiments of the present invention.

FIG. 1B is an enlarged plan view of a bond site in the multi-layer absorbent mat of FIG. 1A.

FIG. 1C is a cross-sectional view of the bond site of FIG. 1B taken along lines 1C—1C.

FIG. 1D is a cross-sectional view of the bond site of FIG. 1B according to another embodiment of the present invention wherein the top and bottom layers are bonded to the absorbent media disposed therebetween via binder fibers in the absorbent media.

FIG. 2A is a perspective view of a multi-layer absorbent mat according to other embodiments of the present invention.

FIG. 2B is an enlarged plan view of a bond site in the multi-layer absorbent mat of FIG. 2A.

FIG. 2C is a cross-sectional view of the bond site of FIG. 2B taken along lines 2C—2C.

DETAILED DESCRIPTION OF THE INVENTION

Figure 3:
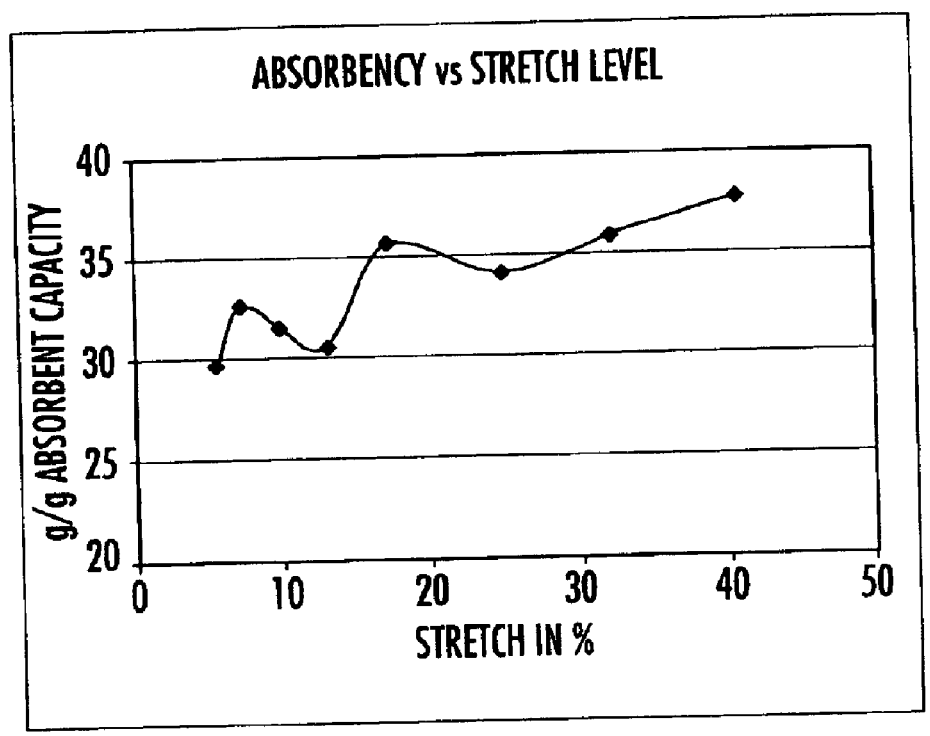
FIG. 3 is a graph illustrating the relationship of absorbency and stretch level for the multi-layer absorbent mat of FIGS. 2A–2C.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As used herein, the term "nonwoven web", refers to a web that has a structure of individual fibers or threads which are interlaid, but not in any regular, repeating manner. Nonwoven webs may be formed by a variety of processes, such as, for example, meltblowing processes, spunbonding processes and bonded carded web processes.

As used herein, the term "superabsorbent" refers to a special group of polymers that have the ability to absorb many times their own mass of liquid. Superabsorbents are configured to swell very rapidly in liquid, but not dissolve.

As used herein, the term "polymer" generally includes, but is not limited to, homopolymers, copolymers, such as, for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiaotactic and random symmetries.

Referring to FIGS. 1A–1D, a multi-layer absorbent mat 10, according to embodiments of the present invention is illustrated. The illustrated mat 10 includes top and bottom layers 12, 14 of substantially liquid impermeable (i.e., monolithic) thermoplastic film, and absorbent media 16 disposed between the top and bottom layers 12, 14. The top and bottom layers 12, 14 are thermally bonded directly together through the absorbent media 16 at multiple, spaced-apart bond sites 18, as illustrated in FIG. 1C. Alternatively, the top and bottom layers 12, 14 are bonded to the absorbent media 16 at multiple, spaced-apart bond sites 18 via binder fibers in the absorbent media 16, as illustrated in FIG. 1D.

Each bond site 18 is defined by a bond portion 20 where the top and bottom layers 12, 14 are thermally bonded directly together through the absorbent media 16 and a peripheral portion 22 adjacent to the bond portion 20. Fibers within the absorbent media 16 typically protrude from the top and bottom layers 12, 14 at the bond portion 20. One or more ruptures or perforations 24 are typically formed in at least one of the top or bottom layers 12, 14 in the peripheral portion 22, as a result of thermal bonding. Each perforation 24 is in communication with the absorbent media 16 and provides a pathway through which liquid can pass from external to the mat 10 into the absorbent media 16. An enlarged bond site 18 is illustrated in FIGS. 1B–1C and illustrates perforations 24 formed in the bond peripheral portion 22.

The top and bottom layers 12, 14 are thermally bonded together at multiple, spaced-apart locations or sites. However, other attachment methods may be utilized including, but not limited to, ultrasonic bonding, mechanical bonding, or other attachment means or combinations of these attachment means as are known in the art. Moreover, the bond sites 18 may have various configurations and patterns. The total bond area (i.e., the total area of all bonds) is preferably between about five percent and about fifty percent (5%–50%) of the area of the top and bottom layers 12, 14, and more preferably between about ten percent and about twenty five percent (10%–25%) of the area of the top and bottom layers 12, 14. According to embodiments of the present invention, the top and bottom layers 12, 14 may be sealed (e.g., heat sealed, ultrasonically sealed, etc.) together along respective peripheral edges 12a, 14a thereof to further contain the absorbent media 16.

Thermal bonding is performed using sufficient force to bond the top layer 12 through to the bottom layer 14. The bonding may be enhanced by the incorporation of compatible thermoplastic fiber(s) into the absorbent media 16. When thick or heavy absorbent media 16 is utilized, this may be necessary to ensure adequate bonding. The force is determined in individual cases depending on the nature of the absorbent media 16. The absorbent media may or may not participate in the thermal bonding; however, when fibers in the absorbent media 16 do participate, the bonding is typically more secure. Each bond site forms a visible deformation of the structure even when the top and bottom layers are bonded to the absorbent media in lieu of each other. Thermal bonding may be performed using an engraved roll over a smooth roll, or matched engraved rolls, as would be understood by those skilled in the art of thermal bonding.

Multiple spaced-apart bonding as illustrated in FIG. 1A can help prevent crushing or compressing of the absorbent media 16. Compression can reduce the void volume of the absorbent media 16 and limit the swelling of superabsorbent polymers in the absorbent media 16. The spaced-apart thermal bond sites 18 also reduce the damage to the absorbent capacity that may occur when adhesives are used.

The absorbent media 16 may be manufactured from a wide variety of liquid-absorbent materials including, but not limited to, wood pulp, creped cellulose wadding, meltblown polymers including coform, nonwoven fabric structures such as thermal bond or resin bond that contain absorbent fiber or superabsorbent particles or fibers, chemically stiffened, modified or cross-linked cellulosic fibers, tissue including tissue wraps and tissue laminates, absorbent foams, absorbent sponges, super-absorbent polymers, absorbent gelling materials, or any equivalent material or combinations of materials. Exemplary absorbent media are disclosed in U.S. Pat. Nos. 5,260,345; 5,268,224; and 5,628,097, each of which is incorporated herein by reference in its entirety.

The absorbent media 16 may include tissue, tissue containing super-absorbent polymer, air-laid pulp, air-laid pulp with super-absorbent fiber or powder, absorbent nonwovens, or foams. Suitable air-laid pulps are available from Concert Industries and from Fort James Corporation. The use of air-laid pulp with super-absorbent fiber is preferred. The air-laid pulp material may be bonded with thermoplastic binder fiber, or with sprayed, printed, or coated binder. Suitable grades of air-laid pulp include Concert Industries' grade EDT.150.105.AS1359, or EDT 160.101.BS1359. Additionally, the absorbent media 16 may include super-absorbent polymer(s) in the form of a fiber, powder, flake, particle, or granule, or other form.

Suitable absorbent nonwovens include needlepunched rayon or tencel, which are available from American Nonwovens, Columbus, Miss. Suitable tissues are available from Procter & Gamble and Cellutissue Corporation. Tissues may range from about ten grams per square meter to about sixty grams per square meter (10–60 gsm). A suitable product is Grade 3141-33, 20 gsm, single ply white ultra absorbent laminating core tissue from Interlake.

If binder fibers are present in the absorbent media 16, the binder fibers and the top and bottom layers 12, 14 are preferably compatible to facilitate thermal bonding. Coextruded materials such as polypropylene/polyethylene, polyester/polyethylene, and polyester/polypropylene fibers are preferred binder fibers. In the illustrated embodiment, the absorbent media 16 includes wood pulp 16a, superabsorbent fibers 16b and binder fibers 16c.

According to embodiments of the present invention, the absorbent media 16 has a liquid capacity of at least about ten grams of liquid per one gram of absorbent media (10 g/1 g). In addition, the absorbent media 16 may include thermoplastic material that is compatible with the thermoplastic material of the top and bottom layers 12, 14. This compatible material facilitates bonding between the top and bottom layers 12, 14.

According to embodiments of the present invention, one or more of the top and bottom layers 12, 14 may be formed from nonwoven material or from monolithic polymeric film. Each layer 12, 14 may have a thickness, for example, of between about 0.3 mils and about 10.0 mils. Exemplary nonwoven materials that may be utilized include spunbonded webs, meltblown webs, and/or bonded carded webs. Moreover, a nonwoven web according to embodiments of the present invention may include synthetic fibers (e.g., nylon, polyester, acrylic, polyolefin, polyethylene, polypropylene, modacrylic, polyvinyl chloride, polyvinylidene chloride, urethane, copolyether ester, copolyether amide, polyolefin, etc.), natural fibers (e.g., wood fibers, cotton fibers, etc.), or a blend of synthetic and natural fibers. A nonwoven web according to embodiments of the present invention may be made of fiber forming polymers such as, for example, polyolefins. Exemplary polyolefins include one or more of polypropylene, polyethylene, ethylene copolymers, propylene copolymers, and butene copolymers.

An example of spunbonded fabric includes CELESTRA® brand spunbonded polypropylene from BBA Corporation, or SOFTEX® brand coextruded polypropylene core polyethylene sheath spunbond. Polyethylene spunbond such as DALTEX® brand spunbond from Don & Low Corporation is also a preferred material.

If a nonwoven web is utilized, blends of thermoplastic fibers and non-thermoplastic fibers may be utilized if the blended fabrics are capable of being thermally bonded. If a high percentage of non-thermoplastic fiber is not present or if bond strength is lower than desired, a bond improving additive such as a thermoplastic powder adhesive, or a binder fiber, may be added to the web.

Exemplary monolithic polymeric films include, but are not limited to polyethylene, polypropylene, polyolefin, nylon, polyester, acrylic, modacrylic, polyvinyl chloride, polyvinylidene chloride, urethane, copolyether ester, and copolyether amide. A thermoplastic mesh or netting may also be used. Suitable plastic netting is available from Delstar, Inc. as DELNET® brand netting, and from Smith & Nephew, Inc., and Conwed, Inc. Additionally, formed perforated films may be used such as the VISPORE® brand films from Tredegar, Inc.

Referring to FIGS. 2A–2C, a multi-layer absorbent mat 110, according to embodiments of the present invention is illustrated. The illustrated mat 110 includes top and bottom layers 112, 114 of substantially liquid impermeable (i.e., monolithic) thermoplastic film, and absorbent media 116 disposed between the top and bottom layers 112, 114. The top and bottom layers 112, 114 are thermally bonded directly together through the absorbent media 16 at multiple, spaced-apart bond sites 118, as illustrated. Alternatively, the top and bottom layers 112, 114 are thermally bonded to the absorbent media 16 at multiple, spaced-apart bond sites 118, via binder fibers in the absorbent media 16.

Each bond site 118 is defined by a bond portion 120 where the top and bottom layers 112, 114 are thermally bonded directly together through the absorbent media 116 and a peripheral portion 122 adjacent to the bond portion 120. However, other attachment methods may be utilized including, but not limited to, ultrasonic bonding, mechanical bonding, or other attachment means or combinations of these attachment means as are known in the art. The total bond area (i.e., the total area of all bonds) is preferably between about five percent and about fifty percent (5%–50%) of the area of the top and bottom layers 112, 114, and more preferably between about ten percent and about twenty five percent (10%–25%) of the area of the top and bottom layers 112, 114. According to embodiments of the present invention, the top and bottom layers 112, 114 may be sealed (e.g., heat sealed, ultrasonically sealed, etc.) together along respective peripheral edges 112a, 114a thereof to further contain the absorbent media 116.

Thermal bonding is performed using sufficient force to bond the top layer 112 through to the bottom layer 114. The bonding may be enhanced by the incorporation of compatible thermoplastic fiber(s) into the absorbent media 116. When thick or heavy absorbent media 116 is utilized, this may be necessary to ensure adequate bonding. The force is determined in individual cases depending on the nature of the absorbent media 116. The absorbent media may or may not participate in the thermal bonding; however, when fibers in the absorbent media 16 do participate, the bonding is typically more secure.

Thermal bonding may be performed using various techniques, including those described above with respect to the mat 10 of FIGS. 1A–1C. The top and bottom layers 112, 114 may be formed from various monolithic polymeric films as described above with respect to the mat of FIGS. 1A–1C.

Each layer 112, 114 may have a thickness, for example, of between about 0.3 mils and about 10.0 mils. In addition, the absorbent media may include various materials as described above with respect to the mat of FIGS. 1A–1C.

Once the top and bottom layers 112, 114 are bonded together, an aperture 130 is formed through the top and bottom layers at each respective bond site 118 by stretching the multi-layer absorbent mat 110 by an amount between about one percent and about seventy percent (1%–70%) of a relaxed configuration thereof. According to embodiments of the present invention, a multi-layer absorbent mat 110 may be substantially evenly stretched by passing the mat 100 through interdigitated rolls. An exemplary method using interdigitated rolls is described in U.S. Pat. No. 5,628,097 which is incorporated herein by reference in its entirety. Other methods of stretching include, but are not limited to, stretching via bow rolls and tenter framing. Stretching may be performed in one or more directions, and either substantially simultaneously or sequentially. Other exemplary stretching processes are disclosed in U.S. Pat. Nos. 4,368,565 and 4,116,892, each of which is incorporated herein by reference in its entirety.

An enlarged bond site 118 is illustrated in FIGS. 2B–2C and illustrates an aperture 130 formed at a bond site 118. One or more ruptures or perforations 124 are formed in the peripheral portion 122 of each bond site thereof, as illustrated in FIGS. 2B–2C. Each perforation 124 is in communication with the absorbent media 116 and provides a pathway through which liquid can pass from external to the mat 110 into the absorbent media 116. As illustrated in FIGS. 2A–2B, various fibers from the absorbent media 116 may protrude through the perforations 124 formed in the peripheral portion 122 of each bond site 118.

Applicant has unexpectedly discovered that absorbency of a mat according to embodiments of the present invention increases with stretch level, as illustrated in FIG. 3. As a result, a mat according to embodiments of the present invention can be stretched so as to fully cover the tray of a food product package and so as to have increased absorbency over an unstretched mat.

Figure 4:
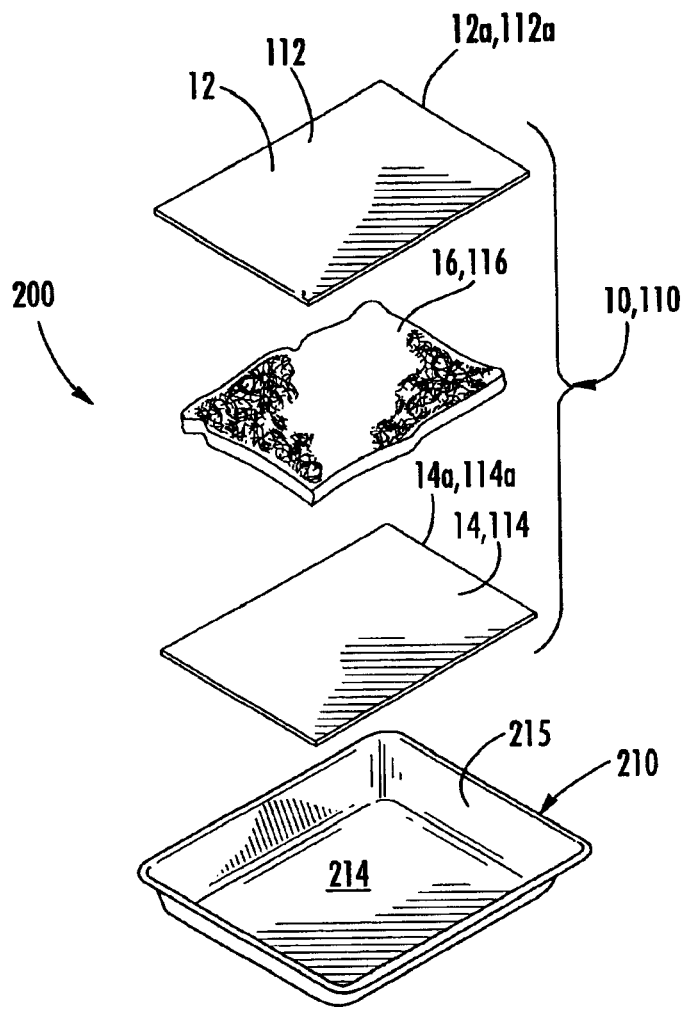
FIG. 4 is an exploded perspective view of a food product package incorporating a multi-layer absorbent mat, according to embodiments of the present invention.
Figure 5:
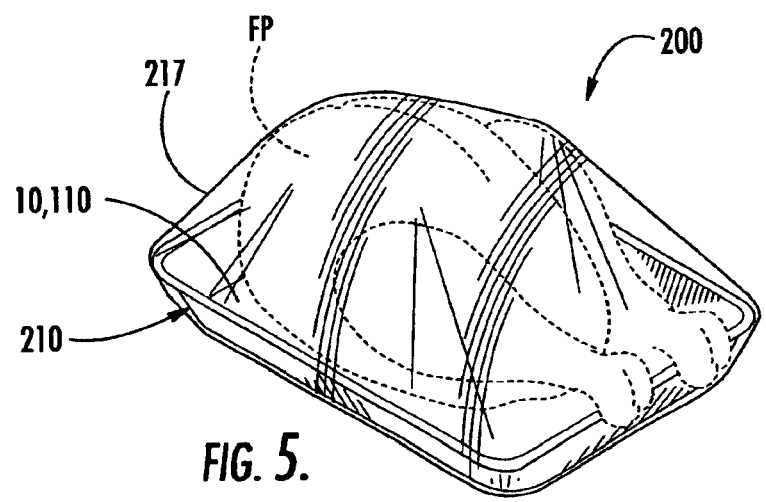
FIG. 5 is a perspective view of the food product package of FIG. 4 including a food product and a surrounding plastic wrap.

Referring now to FIG. 4, a food product package 200, within which multi-layer absorbent mats 10, 110, according to embodiments of the present invention, may be utilized, is illustrated. The illustrated food product package 200 includes a tray 210 and a multi-layer absorbent mat 10, 110. The tray 210 has a bottom wall 214 and a raised rim 215. The multi-layer absorbent mat 10, 110 is disposed on the tray bottom wall 214 and is configured to absorb liquids exuded from food products placed thereon via the perforations 24, 124 formed at each bond site 18, 118 as described above. As illustrated in FIG. 5, an overwrap of flexible film material 217 covers a food product FP placed on the mat 10, 110 within the tray 210.

Unlike conventional food product packages, mats according to embodiments of the present invention can have their peripheral edges sealed together. As such, absorption of liquids from food products via perforations 24, 124 is extremely efficient and effective.

Mats 10, 110 may be manufactured in a wide variety of sizes and shapes (e.g., rectangular, circular, oval, hourglass, "T"-shaped, asymmetric, etc.), and can be adapted to any type and shape of food product being packaged. The layers 12, 112 and 14, 114 need not be identical in shape or composition. The layers 12, 112 and 14, 114 maintain separation between a food product FP and the absorbent media 16, 116. This prevents contamination of the food product FP with particles from the absorbent media and allows for easy separation of the food product from the mat 12 without causing delamination of the mat 10, 110, even when frozen.

The following examples are provided in order to further illustrate various embodiments of the invention and are not to be construed as limiting the scope thereof.

EXAMPLE 1

A highly absorbent structure comprised of an airlaid nonwoven sandwiched between two monolithic films was produced. The individual film and airlaid layers were passed between a patterned calendar roll and a smooth anvil roll. The patterned calendar roll produced multiple spaced apart bond sites. The bond pattern coupled with temperature and pressure resulted in a structure where the two thermoplastic layers were bonded through the absorbent core. This airlaid was encapsulated between the bond site areas. Bonding temperature was 200° F. for both the patterned and smooth calendar rolls. Pressure in the calendar nip was approximately 600 psi. The airlaid nonwoven was produced by Concert Industries (style 130.2382) and had a basis weight of 130 gsm. The airlaid was comprised of 30% super absorbent fiber, 16% polyethylene/polyester bicomponent fiber (sheath/core), and 64% wood pulp. The films were both 0.5 mil low density polyethylene (style FT220) embossed films manufactured by Filmtech. Gross absorbency in deionized water using a 1 minute dunk and a 1 minute drip is shown below in Table 1.

TABLE 1

| Weight (gsm) | Thickness (in) | Absorbency in Deionized Water ($g_{water}/g_{fabric}$) | Absorbency in Deionized Water ($g/in^2$) |
| --- | --- | --- | --- |
| 159.2 | 0.040 | 25.8 | 2.65 |

EXAMPLES 2–9

Highly absorbent porous structures comprised of an airlaid nonwoven sandwiched between two monolithic films were produced. First, the individual film and airlaid layers were passed between a patterned calendar roll and a smooth anvil roll. The patterned calendar roll produced multiple spaced apart bond sites. The bond pattern coupled with temperature and pressure resulted in a structure where two thermoplastic layers were bonded through the absorbent core. This airlaid was encapsulated between the bond site areas. Bonding temperature was 200° F. for both the patterned and smooth calendar rolls. Pressure in the calendar nip was approximately 600 psi. The airlaid nonwoven was produced by Concert Industries (style 130.2382) and had a basis weight of 130 gsm. The airlaid was comprised of 30% super absorbent fiber, 16% polyethylene/polyester bicomponent fiber (sheath/core), and 64% wood pulp. The films were both 0.5 mil low density polyethylene (style FT220) embossed films manufactured by Filmtech Corporation.

Following bonding, composites were then stretched differing amounts in the cross direction ranging from 0.0% to 40.7%. Transverse direction extension resulted in the formation of small tears at the bond sites. The size of the rupture was dependent on the level of stretch. The airlaid was still contained in the land area between the bond sites. Table 2 shows gross absorbency using a 1 minute dunk and one minute drip test protocol in deionized water as stretch level increased.

TABLE 2

| Examples | Stretch (%) | Basis Weight w/o film (gsm) | Thickness (in) | Absorbency in Deionized Water (g/in²) | Absorbency in Deionized Water (g_water/g_fabric) |
|---|---|---|---|---|---|
| 1 | 0.0 | 159.2 | 0.040 | 2.65 | 25.8 |
| 2 | 5.5 | 140.6 | 0.040 | 2.68 | 29.6 |
| 3 | 7.2 | 148.7 | 0.044 | 3.12 | 32.6 |
| 4 | 9.8 | 146.0 | 0.046 | 2.98 | 31.6 |
| 5 | 13.1 | 139.2 | 0.045 | 2.74 | 30.6 |
| 6 | 17.3 | 132.7 | 0.046 | 3.05 | 35.6 |
| 7 | 24.8 | 126.4 | 0.048 | 2.78 | 34.1 |
| 8 | 32.2 | 110.3 | 0.052 | 2.54 | 35.9 |
| 9 | 40.7 | 111.9 | 0.048 | 2.73 | 37.8 |

The initial composite was stretched incrementally and the gram/gram absorbency was measured. FIG. 3 shows a steady increase in the absorbency as the stretch is increased. The absorbency of the products is often measured in saline solutions of from 0.05% to 1%. These saline levels are seen in the fluids that leach from meat when packed for sale. The absorbency of the super-absorbent fibers is reduced by saline content and therefore the blend of cellulose fibers with super-absorbent fibers is used. Depending on the fluid to be absorbed, the composition of the absorbent layer may be adjusted appropriately.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

That which is claimed is:

1. A multi-layer absorbent mat, comprising:
   top and bottom layers of thermoplastic material; and
   absorbent media disposed between the top and bottom layers;
   wherein the top and bottom layers are thermally banded directly together through the absorbent media at multiple, spaced-apart locations, wherein one or more perforations are formed as a result of thermal bonding in at least one of the top or bottom layers in a peripheral portion of each bond, wherein the perforations are in communication with the absorbent media, and wherein the absorbent media has a liquid capacity of at least about ten grains of liquid per one gram of absorbent media.

2. The multi-layer absorbent mat of claim 1, wherein at least one of the top and bottom layers comprises nonwoven material.

3. The multi-layer absorbent mat of claim 2, wherein the nonwoven material comprises synthetic fibers.

4. The multi-layer absorbent mat of claim 3, wherein the synthetic fibers are single, bicomponent, or multicomponent in structure and comprise polymers selected from the group consisting of olefin fibers, nylon fibers, polyester fibers, copolyester fibers, viscous fibers, acrylic fibers, modacrylic fibers, polyvinyl chloride fibers, polyvinylidene chloride fibers, urethane fibers, copolyether ester fibers, and copolyether amide fibers.

5. The multi-Layer absorbent mat of claim 2, wherein the nonwoven material comprises natural fibers.

6. The multi-layer absorbent mat of claim 5, wherein the natural fibers are selected from the group consisting of wood fibers and cotton fibers.

7. The multi-layer absorbent mat of claim 2, wherein the nonwoven thermoplastic material comprises a blend of synthetic and natural fibers.

8. The multi-layer absorbent mat of claim 1, wherein at least one of the top and bottom layers comprises a mesh material.

9. The multi-layer absorbent mat of claim 1, wherein at least one of the top and bottom layers comprises monolithic thermoplastic film.

10. The multi-layer absorbent mat of claim 9, wherein the thermoplastic film is selected from the group consisting of nylon film, polyester film, acrylic film, modacrylic film, polyvinyl chloride film, polyvinylidene chloride film, urethane film, copolyether ester film, and copolyether amide film.

11. The multi-layer absorbent mat of claim 1, wherein the top and bottom layers are sealed together along respective peripheral edges thereof.

12. The multi-layer absorbent mat of claim 1, wherein the top and bottom layers each have a thickness of between about 0.3 mils and about 10.0 mils.

13. The multi-layer absorbent mat of claim 1, wherein at least one of the top and bottom layers comprise polyolefin.

14. The multi-layer absorbent mat of claim 1, wherein the absorber media comprises material selected from the group consisting of paper nonwoven fabrics, super-absorbent polymers, foams and cellulose.

15. The multi-layer absorbent mat of claim 14, wherein super-absorbent polymers are in the form of fibers, powders, flakes, particles, or granules.

16. A food product package, comprising:
   a tray with a bottom wail and a raised rim;
   a multi-layer absorbent mat disposed on the tray bottom wall, comprising:
      top and bottom layers of thermoplastic material; and
      absorbent media disposed between the top and bottom layers;
      wherein the top and bottom layers are thermally bonded directly together through the absorbent media at multiple, spaced-apart locations, wherein one or more perforations are formed as a result of thermal bonding in at least one of the top or bottom layers in a peripheral portion of each bond, wherein the perforations are in communication with the absorbent media, and wherein the absorbent media has a liquid capacity of at least about ten grams of liquid per one gram of absorbent media.

17. The food product package of claim 16, wherein least one of the top and bottom layers comprises nonwoven material.

18. The food product package of claim 17, wherein the nonwoven material comprises synthetic fibers.

19. The food product package of claim 18, wherein the synthetic fibers are single, bicomponent, or multicomponent in structure and comprise polymers selected from the group consisting of olefin fibers, nylon fibers, polyester fibers, copolyester fibers, viscous fibers, acrylic fibers, modacrylic fibers, polyvinyl chloride fibers, polyvinylidene chloride fibers, urethane fibers, copolyether ester fibers, and copolyether amide fibers.

20. The food product package of claim 17, wherein the nonwoven material comprises natural fibers.

21. The food product package of claim 20, wherein the natural fibers are selected from the group consisting of wood fibers and cotton fibers.

22. The food product package of claim 17, wherein the nonwoven thermoplastic material comprises a blend of synthetic and natural fibers.

23. The food product package of claim 16, wherein at least one of the top and bottom layers comprises a mesh material.

24. The food product package of claim 16, wherein at least one of the top and bottom layers comprises monolithic thermoplastic film.

25. The food product package of claim 24, wherein the thermoplastic film is selected from the group consisting of nylon film, polyester film, acrylic film, modacrylic film, polyvinyl chloride film, polyvinylidene chloride film, urethane film, copolyether ester film, and copolyether amide film.

26. The food product package of claim 16, wherein the top and bottom layers are sealed together along respective peripheral edges thereof.

27. The food product package of claim 16, wherein the top and bottom layers each have a thickness of between about 0.3 mils and about 10.0 mils.

28. The food product package of claim 16, wherein at least one of the top and bottom layers comprise polyolefin.

29. The food product package of claim 16, wherein the absorbent media comprises material selected from the group consisting of paper, nonwoven fabrics, super-absorbent polymers, foams and cellulose.

30. The food product package of claim 29, wherein super-absorbent polymers are in the form of fibers, powders, flakes, particles, or granules.

31. The food product package of claim 16, further comprising an overwrap of flexible film material that is configured to cover a food product placed on the multi-layer absorbent mat within the tray.

* * * * *

UNITED STATES PATENT AND TRADEMARK OFFICE
CERTIFICATE OF CORRECTION

PATENT NO. : 6,966,436 B2
DATED : November 22, 2005
INVENTOR(S) : Baldwin, Jr. et al.

It is certified that error appears in the above-identified patent and that said Letters Patent is hereby corrected as shown below:

<u>Column 9,</u>
Line 48, should read -- about ten grams of liquid per one gram of absorbent --.
Line 59, should read -- copolyester fibers, viscose fibers, acrylic fibers, modacrylic --.
Line 63, should read -- 5. The multi-layer absorbent mat of claim 2, wherein the --.

<u>Column 10,</u>
Line 24, should read -- absorbent media comprises material selected from the group --.
Line 47, should read -- 17. The food product package claim 16, wherein at least --.

Signed and Sealed this

Twenty-eighth Day of March, 2006

JON W. DUDAS
*Director of the United States Patent and Trademark Office*